UNITED STATES PATENT OFFICE.

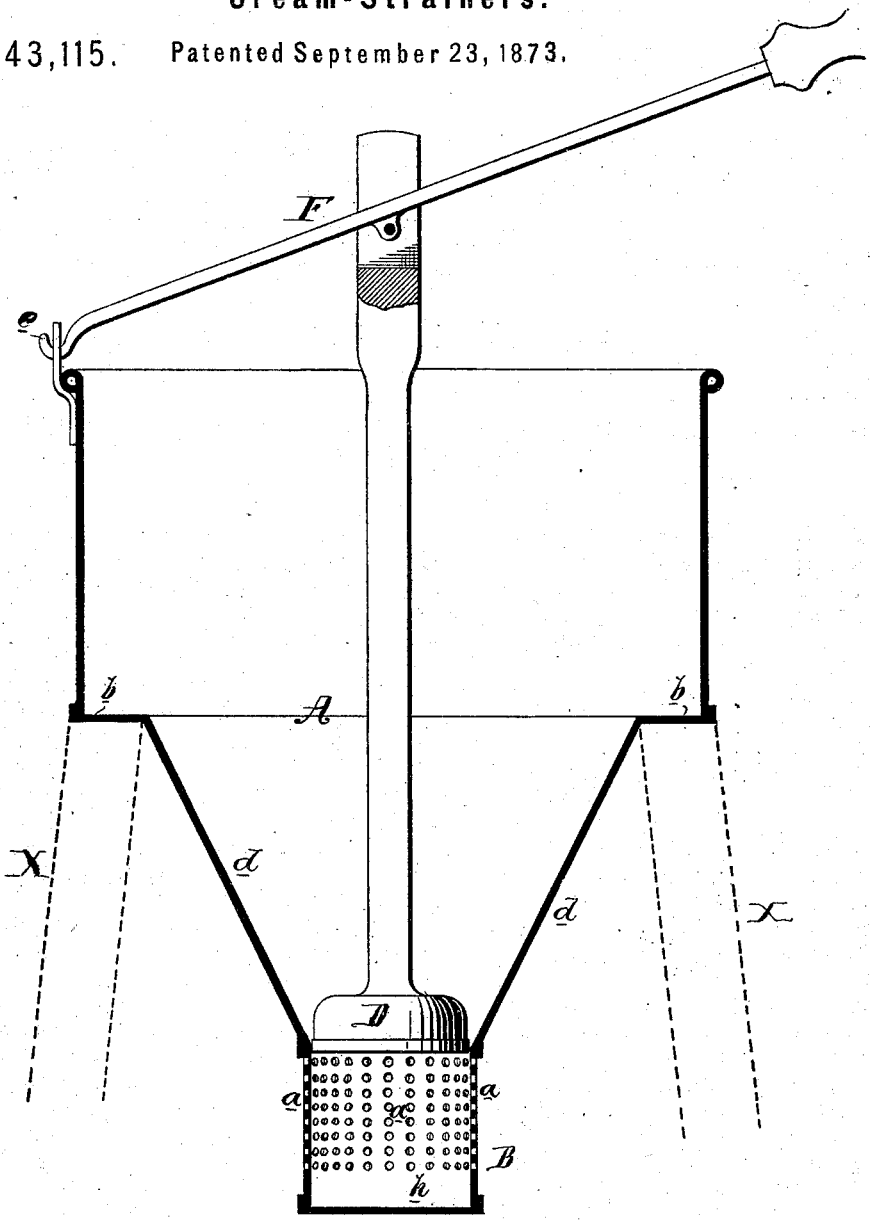

RICHARD W. BARNARD, OF KENNETT SQUARE, PENNSYLVANIA.

IMPROVEMENT IN CREAM-STRAINERS.

Specification forming part of Letters Patent No. 143,115, dated September 23, 1873; application filed July 16, 1873.

*To all whom it may concern:*

Be it known that I, RICHARD W. BARNARD, of Kennett Square, Chester county, Pennsylvania, have invented an Improved Cream-Strainer, of which the following is a specification:

The object of my invention is a cheap and effective strainer for separating impurities from cream before introducing the same into a churn; the said strainer consisting of a vessel, A, having a cylindrical lower portion, B, through perforations $a$, in the sides of which the cream is forced by a vertically-sliding plunger, D, operated by a lever, F, or otherwise, all as plainly shown in the vertical sectional view of the accompanying drawing.

The vessel A may be of any desired shape and size, but I prefer to construct it with a ledge, $b$, adapted to the top of a churn, X, and with a funnel-shaped portion, $d$, to extend down into the said churn; this funnel-shaped portion terminating at its lower end in a cylindrical or tubular extension, B, closed at the bottom and having numerous perforations, $a$, at the sides, through which the cream is forced by a snugly-fitting plunger, D, to which a vertical sliding movement is imparted, either directly or through the medium of a lever, F, having its fulcrum at $e$ in a bracket on the side of the vessel, from which it can be unhooked, and removed from the said vessel, with the plunger and rod, to facilitate the cleansing of the same.

It will be observed that the bottom of the tubular extension B is solid, and that the perforations $a$ terminate at some little distance above the said bottom, thus affording a receptacle, $h$, for hairs and other foreign particles beneath the plunger, and preventing them from being forced through and clogging the perforations, while at the same time they are accumulated at a point from which they can be readily removed.

I claim as my invention—

1. A cream-strainer, consisting of a vessel contracted at the bottom to form a perforated extension, B, and provided with a plunger adapted to said extension, substantially as described.

2. The tubular extension B of the said strainer, having a solid bottom and perforations $a$ at the sides terminating at some little distance above the said bottom so as to form a receptacle, $h$, for the purpose specified.

In testimony whereof I have signed my name to this specification in the presence of two subscribing witnesses.

RICHARD W. BARNARD.

Witnesses:
CALEB P. WICKERSHAM,
HARRY J. STUBBS.